United States Patent
Kwon et al.

(10) Patent No.: US 8,409,750 B2
(45) Date of Patent: Apr. 2, 2013

(54) CABLE-TYPE SECONDARY BATTERY

(75) Inventors: Yo-Han Kwon, Daejeon (KR);
Je-Young Kim, Daejeon (KR);
Byung-Hun Oh, Daejeon (KR); Ki-Tae Kim, Daejeon (KR)

(73) Assignee: LG Chem, Ltd. (KR)

( * ) Notice: Subject to any disclaimer, the term of this patent is extended or adjusted under 35 U.S.C. 154(b) by 48 days.

(21) Appl. No.: 13/243,035

(22) Filed: Sep. 23, 2011

(65) Prior Publication Data
US 2012/0015239 A1 Jan. 19, 2012

Related U.S. Application Data

(63) Continuation of application No. PCT/KR2011/000582, filed on Jan. 27, 2011.

(30) Foreign Application Priority Data

Feb. 1, 2010 (KR) ........................ 10-2010-0009050

(51) Int. Cl.
*H01M 2/02* (2006.01)
*H01M 6/08* (2006.01)

(52) U.S. Cl. ....................................... 429/164

(58) Field of Classification Search .................. None
See application file for complete search history.

(56) References Cited

U.S. PATENT DOCUMENTS

2001/0046623 A1 * 11/2001 Akahira ........................ 429/94
2012/0015233 A1    1/2012 Kwon et al.

FOREIGN PATENT DOCUMENTS

| JP | 04169066 A | 6/1992 |
|----|------------|--------|
| JP | 08088016 A | 4/1996 |
| JP | 09-007629 A | 1/1997 |
| KR | 20050099903 A | 10/2005 |
| KR | 20070009231 A | 1/2007 |
| KR | 102007000923 * | 1/2007 |
| KR | 20070043537 A | 4/2007 |
| KR | 20070075928 A | 7/2007 |
| KR | 20100006985 A | 1/2010 |
| WO | 2005098994 A1 | 10/2005 |
| WO | WO 2005098994 A1 * | 10/2005 |

* cited by examiner

*Primary Examiner* — Barbara Gilliam
*Assistant Examiner* — Stephan Essex
(74) *Attorney, Agent, or Firm* — Lerner, David, Littenberg, Krumholz & Mentlik, LLP

(57) ABSTRACT

Provided is a cable-type secondary battery including at least one anode extending longitudinally and having a horizontal cross section of a predetermined shape, a first electrolyte layer surrounding the anode and serving as an ion channel, at least one cathode extending longitudinally and having a horizontal cross section of a predetermined shape, the anode and the cathode arranged in parallel, a second electrolyte layer serving as an ion channel commonly surrounding the anode and the cathode, and a protection coating surrounding the second electrolyte layer. The cable-type secondary battery has free shape adaptation due to its linearity and flexibility. Introduction of the electrolyte layer on the electrode prevents a short circuit. The presence of a plurality of electrodes leads to an increased contact area therebetween and consequently a high battery rate. By adjusting the number of the anodes and the cathodes, it is easy to control the capacity balance therebetween.

15 Claims, 1 Drawing Sheet

US 8,409,750 B2

CABLE-TYPE SECONDARY BATTERY

CROSS-REFERENCE TO RELATED APPLICATION(S)

This application is a continuation of International Application No. PCT/KR2011/000582 filed on Jan. 27, 2011, which claims priority under 35 U.S.C. §119(a) to Korean Patent Application No. 10-2010-0009050 filed in the Republic of Korea on Feb. 1, 2010, the entire contents of which are incorporated herein by reference.

BACKGROUND

1. Field

The present invention relates to a cable-type secondary battery of free shape adaptation.

2. Description of Related Art

Secondary batteries are devices capable of storing energy in chemical form and of converting into electrical energy to generate electricity when needed. The secondary batteries are also referred to as rechargeable batteries because they can be recharged repeatedly. Common secondary batteries include lead accumulators, NiCd batteries, NiMH accumulators, Li-ion batteries, Li-ion polymer batteries, and the like. When compared with disposable primary batteries, not only are the secondary batteries more economically efficient, they are also more environmentally friendly.

Secondary batteries are currently used in applications requiring low electric power, for example, equipment to help the start-up of vehicles, portable devices, tools, uninterruptible power supplies, and the like. Recently, as the development of wireless communication technologies has been leading to the popularization of portable devices and even to the mobilization of many kinds of conventional devices, the demand for the secondary batteries has been dramatically increasing. Secondary batteries are also used in environmentally friendly next-generation vehicles such as hybrid vehicles and electric vehicles to reduce the costs and weight and to increase the service life of the vehicles.

Generally, secondary batteries have a cylindrical, prismatic, or pouch shape. This is associated with a manufacturing process of the secondary batteries in which an electrode assembly composed of an anode, a cathode, and a separator is mounted in a cylindrical or prismatic metal casing or a pouch-shaped casing of an aluminum laminate sheet, and in which the casing is filled with electrolyte. Because a predetermined mounting space for the electrode assembly is necessary in this process, the cylindrical, prismatic or pouch shape of the secondary batteries is a limitation in developing various shapes of portable devices. Accordingly, there is a need for secondary batteries of a new structure that are easily adaptable in shape.

To fulfill this need, suggestions have been made to develop linear batteries having a very high ratio of length to cross-sectional diameter. Korean Patent Publication No. 2005-0099903 discloses a thread-type flexible battery comprising an inner electrode, electrolyte, and an outer electrode, but having a limited structure of one anode and one cathode and consequently low capacity balance. Korean Patent No. 0804411 discloses a linear battery comprising a plurality of anodes and a plurality of cathodes with separators interposed therebetween. Korean Patent Registration No. 0742739 discloses a thread-type flexible battery including cathode threads and anode threads, however this battery does not further include an electrolyte layer.

SUMMARY

It is an object of the present invention to provide a secondary battery of a new linear structure that is easily adaptable in shape and has excellent stability and performance.

A cable-type secondary battery of the present invention may include at least one anode extending longitudinally and having a horizontal cross section of a predetermined shape, a first electrolyte layer surrounding the anode and serving as an ion channel, at least one cathode extending longitudinally and having a horizontal cross section of a predetermined shape, the anode and the cathode arranged in parallel, a second electrolyte layer serving as an ion channel commonly surrounding the anode and the cathode, and a protection coating surrounding the second electrolyte layer.

Also, the cable-type secondary battery may include at least one cathode extending longitudinally and having a horizontal cross section of a predetermined shape, a first electrolyte layer surrounding the cathode and serving as an ion channel, at least one anode extending longitudinally and having a horizontal cross section of a predetermined shape, the anode and the cathode arranged in parallel, a second electrolyte layer serving as an ion channel commonly surrounding the anode and the cathode, and a protection coating surrounding the second electrolyte layer.

The anode or cathode may have a cross section of a circular or polygonal shape, wherein the circular shape may be a circular shape of geometrical symmetry or an oval shape of geometrical asymmetry, and the polygonal shape may be a triangular, square, pentagonal, or hexagonal shape.

Preferably, the anode or cathode may include a current collector and an active material layer formed on the surface of the current collector.

In this instance, the current collector may be preferably made from stainless steel, aluminum, nickel, titanium, sintered carbon, and copper; stainless steel surface-treated with carbon, nickel, titanium, and silver; aluminum-cadmium alloys; non-conductive polymer surface-treated with a conductive material; or conductive polymers. The conductive material may include polyacetylene, polyaniline, polypyrrole, polythiophene, polysulfur nitride, indium thin oxide (ITO), silver, palladium, nickel, and copper. Also, the conductive polymer may include polyacetylene, polyaniline, polypyrrole, polythiophene, and polysulfur nitride.

The anode active material may include carbonaceous materials; lithium-containing titanium composite oxides (LTOs); metals (Me) such as Si, Sn, Li, Zn, Mg, Cd, Ce, Ni, and Fe; alloys of the metals (Me); oxides (MeOx) of the metals (Me); and composites of the metals (Me) and carbon. The cathode active material may include $LiCoO_2$, $LiNiO_2$, $LiMn_2O_4$, $LiCoPO_4$, $LiFePO_4$, $LiNiMnCoO_2$, and $LiNi_{1-x-y-z}Co_xM1_yM2_zO_2$ (M1 and M2 are each independently any one selected from the group consisting of Al, Ni, Co, Fe, Mn, V, Cr, Ti, W, Ta, Mg, and Mo, and x, y, and z are each independently an atomic fraction of each component in the oxide, where $0 \leq x < 0.5$, $0 \leq y < 0.5$, $0 \leq z < 0.5$, $x+y+z \leq 1$).

The first and second electrolyte layers may be formed from a gel polymer electrolyte of PEO, PVdF, PMMA, PAN, or PVAc, or a solid electrolyte of PEO, polyphenylene oxide (PPO), polyetherimide (PEI), polyethersulfone (PES), or PVAc.

In the cable-type secondary battery of the present invention, the first and second electrolyte layers may further include a lithium salt. The lithium salt may include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chlorine borane lithium, aliphatic lower lithium carbonate, and 4-phenyl lithium borate.

EFFECT OF THE INVENTION

A cable-type secondary battery of the present invention has free shape adaptation due to its linearity and flexibility, and thus is applicable to various types of portable devices. Also, the battery has an electrolyte layer formed on an electrode by coating, preventing direct contact between electrodes to eliminate the likelihood of a short circuit, and leading to a relatively increased surface area to achieve a high battery rate. Also, the battery has a plurality of anodes and a plurality of cathodes, which leads to an increased contact area therebetween and consequently a high battery rate, and by adjusting the number of the anodes and the cathodes, it is easier to control the capacity balance therebetween. A short circuit caused by repeated use may be prevented by the presence of a plurality of electrodes.

Other features and aspects may be apparent from the following detailed description, the drawings, and the claims.

Figure 1:
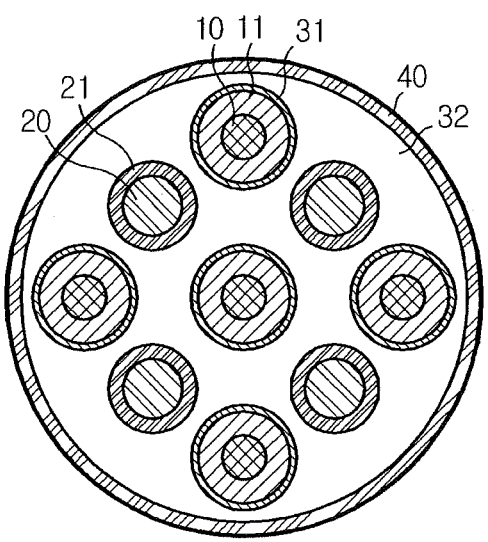
FIG. 1 is a cross-sectional view of a circular cable-type secondary battery.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 2:
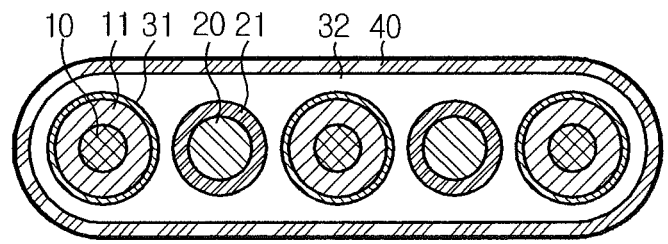
FIG. 2 is a cross-sectional view of an oval cable-type secondary battery.

FIGS. 1 and 2 illustrate examples of cable-type secondary batteries according to the present invention, wherein like elements are referred to like reference numerals. Referring to FIGS. 1 and 2, the cable-type secondary battery includes at least one anode 10 and 11 extending longitudinally and having a horizontal cross section of a predetermined shape, a first electrolyte layer 31 surrounding the anode and serving as an ion channel, at least one cathode 20 and 21 extending longitudinally and having a horizontal cross section of a predetermined shape, a second electrolyte layer 32 serving as an ion channel commonly surrounding the anode and the cathode, and a protection coating 40 surrounding the second electrolyte layer 32. The anode and the cathode are arranged in parallel. The cable-type secondary battery may further comprise an electrolyte layer on the cathode 20 and 21.

Alternatively, the cable-type secondary battery of the present invention may include at least one cathode 10 and 11 extending longitudinally and having a horizontal cross section of a predetermined shape, a first electrolyte layer 31 surrounding the cathode and serving as an ion channel, at least one anode 20 and 21 extending longitudinally and having a horizontal cross section of a predetermined shape, a second electrolyte layer 32 serving as an ion channel commonly surrounding the anode and the cathode, and a protection coating 40 surrounding the second electrolyte layer 32. The anode and the cathode are arranged in parallel. The cable-type secondary battery may further comprise an electrolyte layer on the anode 20 and 21. Here, the predetermined shape is not limited to a specific shape, and may include any shape without departing from the spirit and scope of the present invention.

The cable-type secondary battery of the present invention has a horizontal cross section of a predetermined shape and a linear structure extending perpendicularly to the horizontal cross section. Also, the cable-type secondary battery has flexibility and consequently free shape adaptation. The cable-type secondary battery may have various shapes such as, for example, a circular shape of geometrical symmetry as shown in FIG. 1, or an oval shape of geometrical asymmetry as shown in FIG. 2.

In the cable-type secondary battery of the present invention, the anode or the cathode generally includes a current collector and an active material layer formed on the current collector. However, when an active material layer alone functions as a current collector, the current collector may not be necessary. The anode or the cathode may have a cross section of a circular or polygonal shape, wherein the circular shape may be a circular shape of geometrical symmetry or an oval shape of geometrical asymmetry, and the polygonal shape is not limited to a specific type of polygonal shape unless it is a two-dimensional sheet type. For example, the polygonal shape may be, but is not limited to, a triangular, square, pentagonal, or hexagonal shape.

The present invention is characterized by the first electrolyte layer 31 on at least one of the anode and the cathode to prevent direct contact between the electrodes, thereby preventing a short circuit. The second electrolyte 32 also prevents a short circuit, however there is still a possibility of direct contact between the electrodes due to cracking caused by repeated use or a problem in a manufacturing process. Introduction of the first electrolyte layer 31 can prevent a short circuit caused by the direct contact. The second electrolyte layer 32 surrounds a plurality of anodes and a plurality of cathodes arranged in parallel, however the present invention is not limited in this regard. For example, the second electrolyte layer 32 may be also applied when a plurality of anodes and a plurality of cathodes are twisted. The first and second electrolyte layers 31 and 32 are formed from a gel polymer electrolyte of polyethylene oxide (PEO), polyvinylidene fluoride (PVdF), polymethylmethacrylate (PMMA), polyacrylonitrile (PAN), or polyvinylacetate (PVAc); or a solid electrolyte of PEO, polypropylene oxide (PPO), polyethylene imine (PEI), polyethylene sulphide (PES), or PVAc.

Preferably, a matrix of the solid electrolyte is basically a polymer matrix or a ceramic-glass matrix. Even though a typical polymer electrolyte has sufficient ion conductivity, ions may move slowly, that is, a reaction rate may be low, and thus the gel polymer electrolyte having favorable ion movement is preferred over the solid electrolyte. Because the gel polymer electrolyte has poor mechanical properties, a porous support or a crosslinked polymer may be used to improve the mechanical properties of the gel polymer electrolyte. The electrolyte layer 30 of the present invention may act as a separator, thereby eliminating the use of a separator.

The first and second electrolyte layers 31 and 32 of the present invention may further contain a lithium salt. The lithium salt may improve ion conductivity and reaction rate, and may include, but is not limited to, for example, LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chlorine borane lithium, aliphatic lower lithium carbonate, and tetra-phenyl lithium borate.

As shown in FIGS. 1 and 2, the cable-type secondary battery of the present invention may comprise a plurality of electrodes. In FIG. 1, the battery is shown comprising nine electrodes, and in FIG. 2, the battery is shown comprising five electrodes. The presence of a plurality of electrodes achieves a high battery rate and excellent cell performance as a consequence of an increased contact area with an opposite electrode. Also, the cable-type secondary battery may be subject to a short circuit caused by repeated use due to its flexibility, however the battery may operate even when a short circuit occurs in one electrode. To maintain the capacity balance of the battery, the battery should use a larger amount of an anode active material than that of a cathode active material, due to the fact that an anode active material has a higher capacity per volume than a cathode active material. In the present invention, the capacity balance between anodes and cathodes may be controlled by adjusting the number of anodes and cathodes.

Preferably, the anode or cathode of the present invention includes a current collector 10 or 20 and an active material layer 11 or 21 formed on the surface of the current collector 10 or 20 by coating. The active material allows ion migration through the current collector 10 or 20, and ion migration is carried out by intercalation/disintercalation of ions into/from the electrolyte layers 31 and 32.

Preferably, the current collector 10 or 20 may be made from stainless steel, aluminum, nickel, titanium, sintered carbon, and copper; stainless steel surface-treated with carbon, nickel, titanium, and silver; aluminum-cadmium alloys; non-conductive polymers surface-treated with a conductive material; or conductive polymers.

The current collector 10 or 20 gathers the electrons generated by an electrochemical reaction of the active material, or supplies the electrons required for an electrochemical reaction. Generally, the current collector 10 or 20 is made from metal such as copper or aluminum. However, when the current collector 10 or 20 is particularly a polymer conductor of a non-conductive polymer surface-treated with a conductive material or of a conductive polymer, flexibility is relatively higher than that of the case where the current collector 10 or 20 is made from metal such as copper or aluminum. As the cable-type secondary battery of the present invention may have a plurality of electrodes, a plurality of current collectors may be used. Accordingly, even a small change in flexibility of each current collector may affect the flexibility of the entire battery. Also, replacing a metal current collector with a polymer current collector may achieve weight reduction of the battery.

The conductive material may include polyacetylene, polyaniline, polypyrrole, polythiophene, polysulfur nitride, indium thin oxide (ITO), silver, palladium, nickel, and copper. The conductive polymer may include polyacetylene, polyaniline, polypyrrole, polythiophene, and polysulfur nitride. However, the non-conductive polymer used in the current collector 10 or 20 is not limited to a specific type of non-conductive polymer.

The anode active material may include, but is not limited to, carbonaceous materials; lithium-containing titanium composite oxides (LTOs); metals (Me) such as Si, Sn, Li, Zn, Mg, Cd, Ce, Ni, and Fe; alloys of the metals (Me); oxides (MeOx) of the metals (Me); and composites of the metals (Me) and carbon.

The cathode active material may include, but is not limited to, LiCoO$_2$, LiNiO$_2$, LiMn$_2$O$_4$, LiCoPO$_4$, LiFePO$_4$, LiNiMnCoO$_2$, and LiNi$_{1-x-y-z}$Co$_x$M1$_y$M2$_z$O$_2$ (M1 and M2 are each independently any one selected from the group consisting of Al, Ni, Co, Fe, Mn, V, Cr, Ti, W, Ta, Mg, and Mo, and x, y, and z are each independently an atomic fraction of each component in the oxide, where $0 \leq x < 0.5$, $0 \leq y < 0.5$, $0 \leq z < 0.5$, $x+y+z \leq 1$).

The protection coating 40 of the present invention acts as an insulator, and is formed on the outer surface of the second electrolyte layer 32 to protect the electrode from moisture in the air or from external impact. The protection coating 40 may include typical polymer resins, for example, PVC, high-density polyethylene (HDPE), or epoxy resin.

Hereinafter, a method for manufacturing the cable-type secondary battery as described above is described below in brief.

The anode or the cathode has the active material layer 11 or 21 formed on the current collector 10 or 20 by coating. In this instance, a typical coating process may be used, specifically an electroplating process or an anodic oxidation process. It is preferred to extrusion-coat an electrode slurry including an active material on a current collector through an extruder.

The first electrolyte layer 31 is formed around the anode or the cathode. The second electrolyte layer 32 is formed around both the anode and the cathode. Alternatively, the anode and the cathode may be inserted into the second electrolyte layer 32. The protection coating 40 is formed around the second electrolyte layer 32. Alternatively, after the second electrolyte layer 32 and the protection coating 40 are formed, the anode and the cathode may be inserted into the second electrolyte layer 32.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A cable-type secondary battery comprising:
   at least one anode extending longitudinally and having a horizontal cross section of a predetermined shape;
   a first electrolyte layer surrounding the anode and serving as an ion channel;
   at least one cathode having extending longitudinally and a horizontal cross section of a predetermined shape, the anode and the cathode arranged in parallel;
   a second electrolyte layer serving as an ion channel commonly surrounding and contacting the first electrolyte layer and the cathode; and
   a protection coating surrounding the second electrolyte layer,
   wherein the anode includes an anode current collector and an anode active material layer formed on the outer surface of the anode current collector,
   wherein the cathode includes a cathode current collector and a cathode active material layer formed on the outside of the cathode current collector.

2. The cable-type secondary battery according to claim 1, further comprising:
   an electrolyte layer surrounding the cathode.

3. A cable-type secondary battery comprising:
   at least one cathode extending longitudinally and having a horizontal cross section of a predetermined shape;

a first electrolyte layer surrounding the cathode and serving as an ion channel;

at least one anode extending longitudinally and having a horizontal cross section of a predetermined shape, the anode and the cathode arranged in parallel;

a second electrolyte layer serving as an ion channel commonly surrounding and contacting the anode and the first electrolyte layer; and a protection coating surrounding the second electrolyte layer, wherein the anode includes a anode current collector and an anode active material layer formed on the outer surface of the anode current collector, wherein the cathode includes a cathode current collector and a cathode active material layer formed on the outside of the cathode current collector.

4. The cable-type secondary battery according to claim 3, further comprising:

an electrolyte layer surrounding the anode.

5. The cable-type secondary battery according to claim 1, wherein the anode has a cross section of a circular or polygonal shape.

6. The cable-type secondary battery according to claim 1, wherein the cathode has a cross section of a circular or polygonal shape.

7. The cable-type secondary battery according to claim 1, wherein the anode and cathode current collectors are each independently made from stainless steel, aluminum, nickel, titanium, sintered carbon, and copper; stainless steel surface-treated with carbon, nickel, titanium, and silver; aluminum-cadmium alloys; non-conductive polymer surface-treated with a conductive material; or conductive polymers.

8. The cable-type secondary battery according to claim 7, wherein the conductive material is any one selected from the group consisting of polyacetylene, polyaniline, polypyrrole, polythiophene, polysulfur nitride, indium thin oxide (ITO), silver, palladium, nickel, and copper, or mixtures thereof.

9. The cable-type secondary battery according to claim 7, wherein the conductive polymer is any one selected from the group consisting of polyacetylene, polyaniline, polypyrrole, polythiophene, and polysulfur nitride, or mixtures thereof.

10. The cable-type secondary battery according to claim 1, wherein the anode active material layer is formed from an active material including an active material particle of any one selected from the group consisting of carbonaceous materials; lithium-containing titanium composite oxides (LTOs); metals (Me) including Si, Sn, Li, Zn, Mg, Cd, Ce, Ni, and Fe; alloys of the metals (Me); oxides (MeOx) of the metals (Me); and composites of the metals (Me) and carbon, or mixtures thereof.

11. The cable-type secondary battery according to claim 1, wherein the cathode active material layer is formed from an active material including an active material particle any one selected from the group consisting of $LiCoO_2$, $LiNiO_2$, $LiMn_2O_4$, $LiCoPO_4$, $LiFePO_4$, $LiNiMnCoO_2$, and $LiNi_{1-x-y-z}Co_xM1_yM2_zO_2$ (M1 and M2 are each independently any one selected from the group consisting of Al, Ni, Co, Fe, Mn, V, Cr, Ti, W, Ta, Mg, and Mo, and x, y, and z are each independently an atomic fraction of each component in the oxide, where $0 \leq x < 0.5$, $0 \leq y < 0.5$, $0 \leq z < 0.5$, $x+y+z \leq 1$), or mixtures.

12. The cable-type secondary battery according to claim 1, wherein the first and second electrolyte layers are each independently formed from an electrolyte selected from the group consisting of a gel polymer electrolyte of PEO, PVdF, PMMA, PAN, or PVAc; and a solid electrolyte of PEO, polypropylene oxide (PPO), polyethylene imine (PEI), polyethylene sulphide (PES), or PVAc.

13. The cable-type secondary battery according to claim 1, wherein each of the first and second electrolyte layers further includes a lithium salt, independently.

14. The cable-type secondary battery according to claim 13, wherein the lithium salt is any one selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chlorine borane lithium, aliphatic lower lithium carbonate, and tetra-phenyl lithium borate, or mixtures thereof.

15. A cable-type secondary battery comprising:

at least one anode extending longitudinally and having a horizontal cross section of a predetermined shape;

a first electrolyte layer surrounding the anode and serving as an ion channel;

at least one cathode having extending longitudinally and a horizontal cross section of a predetermined shape, the anode and the cathode arranged in parallel;

a second electrolyte layer serving as an ion channel commonly surrounding and contacting the first electrolyte layer and the cathode; and a protection coating surrounding the second electrolyte layer.

* * * * *